(12) United States Patent
Akashi et al.

(10) Patent No.: US 7,866,957 B2
(45) Date of Patent: Jan. 11, 2011

(54) HERMETIC COMPRESSOR (75) Inventors: Hironari Akashi, Kanagawa (JP); Kosuke Tsuboi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 10/574,383

(22) PCT Filed: Nov. 22, 2005

(86) PCT No.: PCT/JP2005/021931
§ 371 (c)(1), (2), (4) Date: Mar. 31, 2006

(87) PCT Pub. No.: WO2006/057418
PCT Pub. Date: Jun. 1, 2006

(65) Prior Publication Data
US 2008/0247888 A1    Oct. 9, 2008

(30) Foreign Application Priority Data
Nov. 24, 2004  (JP)  ............................. 2004-338443
Nov. 25, 2004  (JP)  ............................. 2004-340235

(51) Int. Cl.
F04B 17/00  (2006.01)
F04B 35/04  (2006.01)
(52) U.S. Cl. ................. 417/410.1; 310/90; 310/156.53; 310/216.016; 310/87
(58) Field of Classification Search ................. 417/415, 417/363, 902, 410.1; 29/598; 310/156, 90, 310/53, 216.016, 87
See application file for complete search history.

(56) References Cited

U.S. PATENT DOCUMENTS

| 4,472,114 | A  | * | 9/1984  | Fujiwara et al. ............. 417/372 |
| 5,683,229 | A  | * | 11/1997 | Stoll et al. .................. 417/366 |
| 6,047,460 | A  | * | 4/2000  | Nagate et al. ................. 29/598 |
| 6,287,092 | B1 | * | 9/2001  | Calciolari et al. ........... 417/415 |
| 6,533,558 | B1 | * | 3/2003  | Matsumoto et al. ...... 417/410.3 |
| 6,547,538 | B1 | * | 4/2003  | Tamura et al. .............. 417/415 |
| 6,582,207 | B2 | * | 6/2003  | Matsumoto et al. ...... 417/410.1 |

(Continued)

FOREIGN PATENT DOCUMENTS

CN    1316037 A    10/2001

(Continued)

OTHER PUBLICATIONS

English translation of Chinese Office Action dated Sep. 28, 2007.

(Continued)

*Primary Examiner*—Devon C Kramer
*Assistant Examiner*—Amene S Bayou
(74) *Attorney, Agent, or Firm*—RatnerPrestia (57) ABSTRACT

A hermetic compressor has a bipolar permanent magnet motor where permanent magnet is disposed in rotor core. A hollow bore is disposed at the end on the compressing element side of the rotor core, and main bearing extends into the bore. The thickness of the rotor core is longer than that of the stator core, thereby widening the magnetic path of the rotor core. The magnetic flux amount generated in the rotor core, which is conventionally insufficient due to existence of the bore, increases, the loss decreases, and the efficiency increases.

10 Claims, 7 Drawing Sheets

U.S. PATENT DOCUMENTS

| | | | |
|---|---|---|---|
| 6,727,627 B1 * | 4/2004 | Sasaki et al. | 310/211 |
| 6,876,119 B2 * | 4/2005 | Sasaki et al. | 310/211 |
| 7,183,683 B2 * | 2/2007 | Shafer et al. | 310/156.28 |
| 7,372,183 B2 * | 5/2008 | Sasaki et al. | 310/156.78 |
| 7,531,934 B2 * | 5/2009 | Hang et al. | 310/156.56 |
| 2004/0057850 A1 * | 3/2004 | Nozaki et al. | 417/415 |
| 2004/0191094 A1 * | 9/2004 | Kojima et al. | 417/415 |
| 2006/0013706 A1 * | 1/2006 | Ishida et al. | 417/386 |
| 2006/0039807 A1 * | 2/2006 | Hamaoka et al. | 417/415 |

FOREIGN PATENT DOCUMENTS

| | | |
|---|---|---|
| EP | 1 111 240 A1 | 6/2001 |
| JP | 08-270558 | 10/1996 |
| JP | 10-318132 | 12/1998 |
| JP | 2001-073948 | 3/2001 |
| JP | 2001073948 A * | 3/2001 |
| KR | 2004-0073268 A | 8/2004 |
| WO | WO 0106624 A1 * | 1/2001 |
| WO | WO 2004/081383 A1 | 9/2004 |

OTHER PUBLICATIONS

International Search Report for application No. PCT/JP2005/021931 dated Jan. 26, 2006.

* cited by examiner

HERMETIC COMPRESSOR

THIS APPLICATION IS A U.S. NATIONAL PHASE APPLICATION OF PCT INTERNATIONAL APPLICATION PCT/JP2005/021931.

Technical Field

The present invention relates to a hermetic compressor used for a freezing cycle in a refrigerator freezer or the like.

Background Art

Recently, regarding a hermetic compressor used for a freezing apparatus in a refrigerator freezer or the like, the increase of the efficiency is desired for reducing consumed power, and the downsizing is desired for increasing the capacity efficiency of the refrigerator freezer.

Japanese Patent Unexamined Publication No. 2001-73948 (hereinafter referred to as "document 1"), for example, discloses a conventional bipolar permanent magnet motor having a built-in permanent magnet in a rotor as an motor element, instead of an induction motor, in order to improve the efficiency.

A conventional hermetic compressor is described hereinafter with reference to the accompanying drawings.

Figure 10:
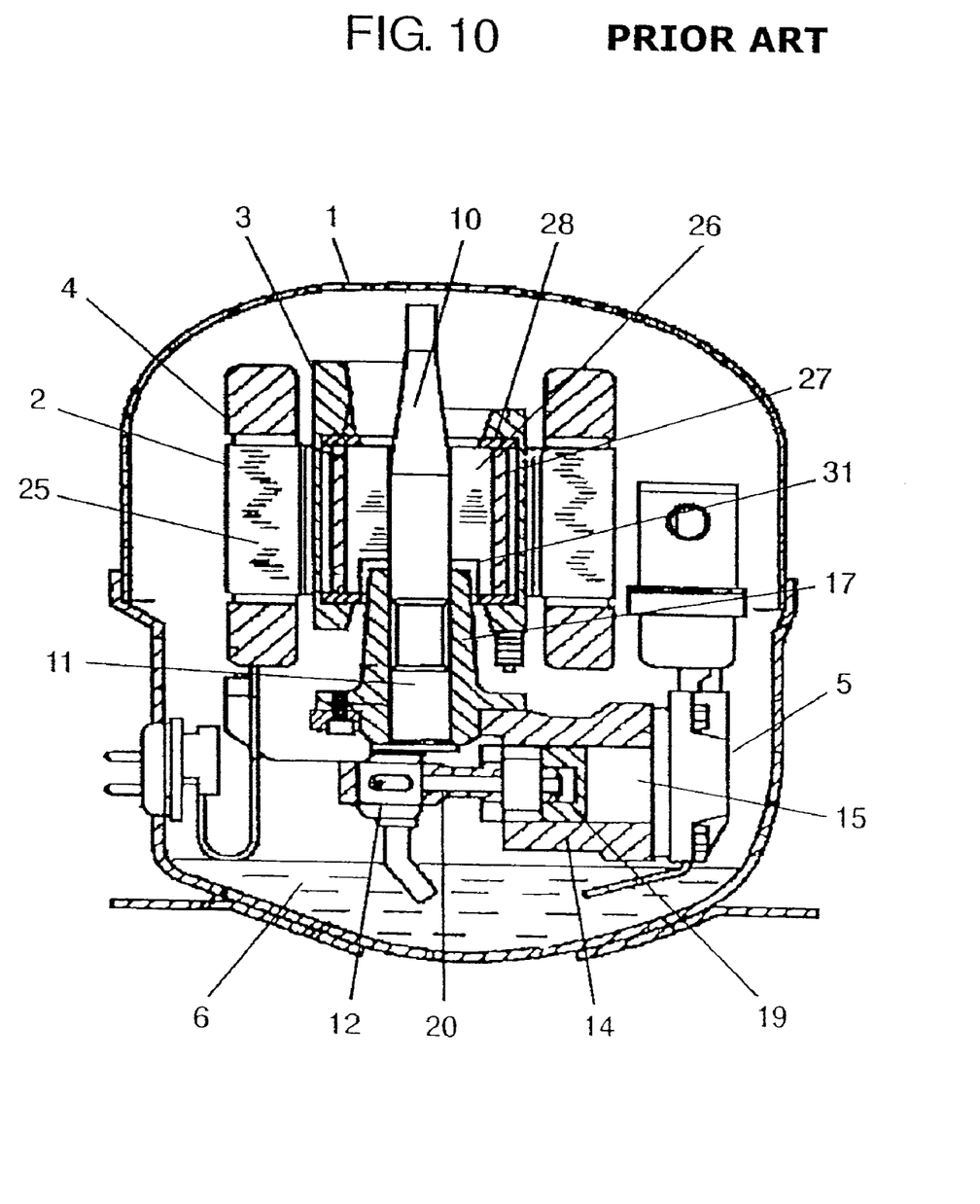
FIG. 10 is a longitudinal sectional view of a conventional hermetic compressor.

FIG. 10 is a longitudinal sectional view of the conventional hermetic compressor described in document 1. As shown in FIG. 10, hermetic container 1 accommodates motor element 4 formed of stator 2 and rotor 3 and compressing element 5 driven by motor element 4. Hermetic container 1 hermetically encloses motor element 4 and compressing element 5.

Lubricating oil 6 is reserved in hermetic container 1. Shaft 10 has main shaft 11 to which rotor 3 is fixed and eccentric shaft 12 formed eccentrically with respect to main shaft 11. Cylinder block 14 has substantially cylindrical compressing chamber 15 and main bearing 17 that is made of aluminum base material, namely non-magnetic material. Piston 19 is inserted into compressing chamber 15 of cylinder block 14 which is slidable back and forth in compressing chamber 15, and is coupled to eccentric shaft 12 through connector 20.

Motor element 4 is a bipolar permanent magnet motor that is formed of the following elements:
 stator 2 where a wire is wound on stator core 25 made of a laminated magnetic steel sheet; and
 rotor 3 where permanent magnet 27 is built in rotor core 26 made of a laminated magnetic steel sheet.

End plate 28 for protection for preventing permanent magnet 27 from dropping is fixed to rotor core 26.

Hollow bore 31 is disposed at an end on a side of rotor core 26 facing compressing element 5, and main bearing 17 extends inside hollow bore 31.

Operations of the hermetic compressor having this configuration are described hereinafter. Rotor 3 of motor element 4 rotates shaft 10, and a rotation of eccentric shaft 12 is transmitted to piston 19 via connector 20, thereby reciprocating piston 19 in compressing chamber 15. By the reciprocation of piston 19, refrigerant gas is sucked from a cooling system (not shown) into compressing chamber 15, compressed, and then discharged to the cooling system again.

The flow and loss of the magnetic flux during the rotation of rotor 3 are described hereinafter. Since main bearing 17 is made of the non-magnetic material, magnetic attraction force does not work between the inner periphery of bore 31 and main bearing 17, and hence torque loss does not occur. Further, since main bearing 17 is made of the non-magnetic material, the magnetic flux from permanent magnet 27 is not attracted to main bearing 17, and hence most of the magnetic flux passes only through rotor core 26. Therefore, core loss (especially, eddy current loss) hardly occurs in main bearing 17, and the efficiency can be increased.

In the conventional configuration, however, magnetic path cannot penetrate through main shaft 11 made of the non-magnetic material. The region through which the magnetic flux can pass in bore 31 of rotor core 26 is therefore small. Therefore, only partially narrow magnetic path can be formed, the magnetic resistance is large, and the magnetic flux amount near bore 31 is smaller than that in the case having no bore 31. Therefore, the loss becomes large disadvantageously.

When the bore is not formed in the bearing structure in order to reduce the loss in bore 31, main bearing 17 cannot extend into bore 31 formed in rotor core 26. In other words, vertical overlap between bore 31 and main bearing 17 is eliminated, and hence rotor 3 moves to the side opposite to compressing element 5 by the depth of bore 31. As a result, the height of hermetic container 1 increases by the depth of bore 31 disadvantageously.

SUMMARY OF THE INVENTION

In the hermetic compressor of the present invention, the motor element is a bipolar permanent magnet motor formed of a stator and a rotor that has a built-in permanent magnet in a rotor core. A hollow bore is disposed at an end on a compressing element side of the rotor core, and a main bearing extends inside the bore.

The axial length of the rotor core is longer than that of a stator core of the stator. The magnetic path of the rotor core can be made wide, so that the magnetic flux amount generated in the rotor core increases, the loss decreases, and the efficiency of the motor element increases. The structure provides a wide magnetic path is provided to smooth flow of magnetic flux by the permanent magnet.

The main shaft may be made of magnetic material. In this case, the main bearing of magnetic material and a shaft that are disposed inside the bore work as the magnetic path, so that the magnetic flux amount (conventionally, insufficient) generated in the rotor increases, and the loss decreases. The structure provides a wide magnetic path provided to smooth flow of magnetic flux by the permanent magnet.

In the hermetic compressor of the present invention, the magnetic path inside the bore can be formed without increasing the height of the hermetic container, so that the magnetic flux amount generated in the rotor increases, the loss decreases, and the efficiency can be increased.

DETAILED DESCRIPTION OF PREFERRED EMBODIMENTS

In the hermetic compressor of the present invention, lubricating oil is reserved in a hermetic container, and a motor element and a compressing element are also accommodated in the hermetic container. The compressing element has a shaft including an eccentric shaft and a main shaft, and a main bearing for pivoting the main shaft. The motor element is a bipolar permanent magnet motor that is formed of a stator and a rotor. The rotor has a built-in permanent magnet in a rotor core. A hollow bore is disposed at an end on a compressing element side of the rotor core, and the main bearing extends inside the bore. The thickness, namely axial length, of the rotor core is longer than that of the stator core of the stator. The magnetic path of the rotor core can be made wide, so that the magnetic flux amount in the rotor core increases and the loss decreases. Conventionally, the magnetic flux amount is insufficient due to the narrow magnetic path by the bore. The thickness of the rotor core that does not directly affect the height of the hermetic container is made long, so that the height of the hermetic container is not increased. Therefore, the hermetic compressor can be downsized and lightened, the cost can be reduced, and the efficiency can be increased.

In the hermetic compressor of the present invention, both axial ends of the rotor core may be disposed outside both axial ends of the stator core, respectively. The magnetic centers of the stator and the rotor substantially match with each other, so that axial electromagnetic force hardly occurs, and electromagnetic force acting on the rotor can be effectively converted to torque for rotating the shaft. Therefore, the efficiency is further increased.

In the hermetic compressor of the present invention, the axial length of the permanent magnet may be shorter than that of the rotor core. The magnetic flux generated by the permanent magnet hardly leaks from an axial end of the rotor core to the outside, so that the material cost of the permanent magnet can be reduced without largely reducing an effective magnetic flux amount. The cost can be further reduced.

The hermetic compressor of the present invention may have the configuration where the axial length of the permanent magnet is shorter than that of the rotor core and the permanent magnet lies on the side opposite to the bore of the rotor. The magnetic flux generated by the permanent magnet is mainly generated in a wide part having no bore in the rotor core, so that a wide magnetic path can be formed, and the material cost of the permanent magnet can be reduced without largely reducing an effective magnetic flux amount of the permanent magnet. The cost can be further reduced.

In the hermetic compressor of the present invention, the bipolar permanent magnet motor used as the motor element may be a self-starting permanent magnet synchronous motor that has the following elements:

many conductor bars of a cage conductor for start on the outer periphery of the rotor core; and a rotor having a plurality of permanent magnets buried in its inner periphery.

A synchronous motor having high efficiency can be employed, and the efficiency of the hermetic compressor can be increased.

In the hermetic compressor of the present invention, the permanent magnet may be a rare-earth magnet. The rear-earth magnet can provide a strong magnetic force, so that the motor can be downsized and lightened, and the hermetic compressor can be downsized and lightened.

In the hermetic compressor of the present invention, the main bearing may be made of magnetic material. The main bearing and shaft made of the magnetic material inside the bore work as a magnetic path, so that the magnetic flux amount generated in the rotor increases beyond the loss by eddy current generated in the main bearing, and the loss decreases. Therefore, the efficiency of the motor element increases and hence the efficiency of the hermetic compressor can be increased.

In the hermetic compressor of the present invention, the main bearing may be made of a sintered iron base material or a casting of iron base material. The bearing can be made of inexpensive iron base material and can be formed unitarily with the cylinder block, so that the cost can be reduced.

In the hermetic compressor of the present invention, the depth of the bore (or axial length of the bore) may be ⅓ of the thickness of the rotor core or more. Extension of the main bearing made of the magnetic material into the bore compensates for insufficiency in magnetic flux in the rotor. Here, the insufficiency is caused by small thickness of the part having no bore in the rotor core. Therefore, in this case, the height of the hermetic container can be made smaller than that in the case where a rotor core has the same thickness and no bore is disposed, and the efficiency can be increased.

In the hermetic compressor of the present invention, the clearance between an outer peripheral edge of the bore and an outer peripheral edge of the main bearing may be set at 0.5 to 3 mm. The outer peripheral surface of the bore corresponds to an inside surface of a cylindrical bore of the rotor core. The magnetic resistance in the clearance between the bore and the main bearing decreases, a strong magnetic path is formed, the leaking magnetic flux decreases, and the magnetic flux amount increases, so that the efficiency can be further increased.

Exemplary embodiments of the present invention are described hereinafter with reference to the accompanying drawings. The present invention is not limited to these exemplary embodiments. For clearly showing each element in the drawings, longitudinal or lateral contraction scale of some elements is extended.

Exemplary Embodiment 1

Figure 1:
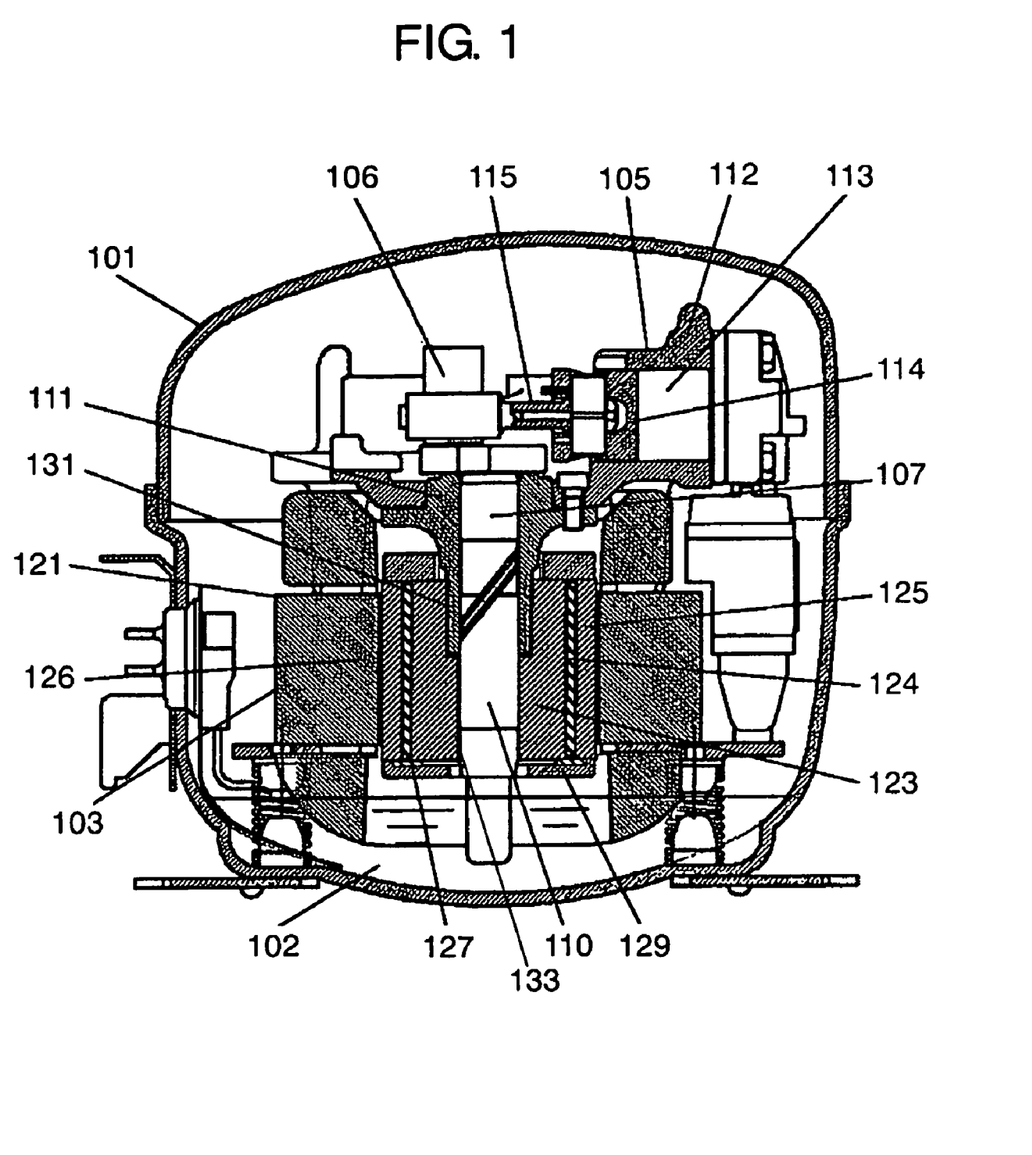
FIG. 1 is a longitudinal sectional view of a hermetic compressor in accordance with exemplary embodiment 1 of the present invention.
Figure 2:
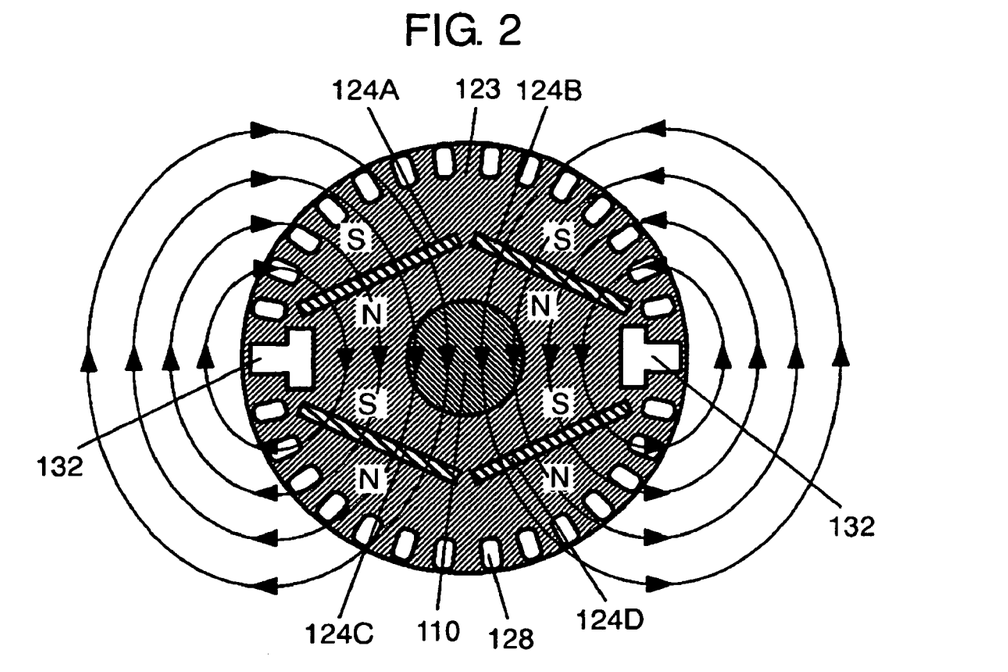
FIG. 2 is an axial sectional view of a part having no bore in a rotor in accordance with exemplary embodiment 1.
Figure 3:
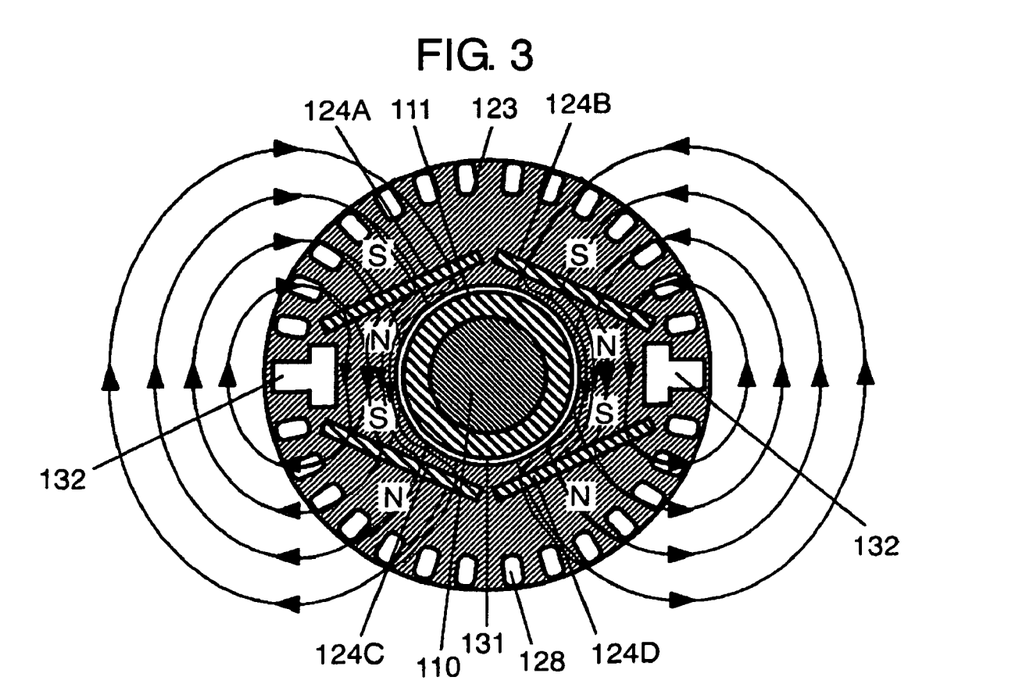
FIG. 3 is an axial sectional view of a part having a bore in the rotor in accordance with exemplary embodiment 1.

FIG. 1 is a longitudinal sectional view of a hermetic compressor in accordance with exemplary embodiment 1 of the present invention. FIG. 2 is an axial sectional view of a part having no bore in a rotor in accordance with exemplary embodiment 1. FIG. 3 is an axial sectional view of a part having a bore in the rotor in accordance with exemplary embodiment 1.

In FIG. 1, FIG. 2 and FIG. 3, hermetic container 101 reserves lubricating oil 102 and accommodates motor element 103 and compressing element 105 driven by motor element 103. Compressing element 105 has shaft 110 including eccentric shaft 106 and main shaft 107 and main bearing 111 for pivoting main shaft 107. Cylinder block 112 has a substantially cylindrical compressing chamber 113. Main bearing 111 made of aluminum-base material, namely non-magnetic material, is fixed to cylinder block 112. Piston 114 is inserted into compressing chamber 113 of cylinder block 112 which can slide back and forth in compressing chamber 113, and is coupled to eccentric shaft 106 through connector 115.

In exemplary embodiment 1, motor element 103 is a bipolar self-starting permanent magnet synchronous motor that is formed of stator 121 and rotor 125. Rotor 125 has built-in permanent magnet 124 in rotor core 123. The thickness, namely axial length, of rotor core 123 is longer than that of stator core 126 of stator 121. End plate 127 for protection for preventing permanent magnet 124 from dropping is fixed to rotor core 123. Many conductor bars 128 disposed in rotor core 123 and short-circuit rings 129 positioned at both axial ends of rotor core 123 are unitarily molded by aluminum die casting, thereby forming a cage conductor for start.

Both axial ends of rotor core 123 are disposed outside both axial ends of stator core 126, respectively. In other words, the upper end of rotor core 123 is higher than that of stator core 126, and simultaneously the lower end of rotor core 123 is lower than that of stator core 126. Hollow bore 131 is disposed at the end on the compressing element 105 side of rotor core 123, and main bearing 111 extends into bore 131.

Here, bore 131 is described. Rotor core 123 has cylindrical through hole 133, and shaft 110 is inserted into through hole 133. Bore 131 is an annular recessed part disposed in the upper part of through hole 133. In other words, bore 131 is a step having a diameter larger than that of through hole 133. Therefore, the lower end of main bearing 111 is accommodated in bore 131, and hence inserted into the gap between shaft 110 and rotor core 123.

Permanent magnet 124 is a magnet plate made of Neodymium Iron Boron ferromagnetic material, namely a rare-earth magnet. Permanent magnet 124 is formed of permanent magnets 124A, 124B, 124C and 124D, and they are arranged as shown in FIG. 2. A pair of permanent magnets 124A and 124B of the same polarity are faced to each other around shaft 110 at a predetermined angle and a predetermined interval. While, a pair of other permanent magnets 124C and 124D of the same polarity are faced to each other around shaft 110 at a predetermined angle and a predetermined interval. All of permanent magnets 124A, 124B, 124C and 124D are buried in parallel with the axis of rotor core 123. The pair of permanent magnets 124A and 124B of the same polarity form one rotor magnetic pole, and the pair of other permanent magnets 124C and 124D of the same polarity also form one rotor magnetic pole. Therefore, whole rotor 125 forms two rotor magnetic poles. For preventing short circuit of magnetic fluxes of adjacent permanent magnets 124A and 124C or of adjacent permanent magnets 124B and 124D, barrier 132 for preventing short circuit of magnets is formed. Barrier 132 is a hole in which aluminum die casting of non-magnetic material is filled.

A refrigerant used in the compressor is a hydrocarbon refrigerant or the like, namely a natural refrigerant having low global warming potential such as R134a or R600a having zero ozone depleting coefficient, and is used in combination with lubricating oil having high compatibility.

Operations and actions of the hermetic compressor having the above-mentioned configuration are described hereinafter.

Rotor 125 of motor element 103 rotates shaft 110, and a rotation of eccentric shaft 106 is transmitted to piston 114 via connector 115, thereby reciprocating piston 114 in compressing chamber 113. Thus, refrigerant gas is sucked from a cooling system (not shown) into compressing chamber 113, is compressed, and is discharged to the cooling system again.

Next, flow of the magnetic flux of permanent magnet 124 is conceptually described with arrow lines in FIG. 2 and FIG. 3. The flow of the magnetic flux in the part having no bore 131 in rotor core 123 is described in FIG. 2. The magnetic flux coming from permanent magnet 124A or permanent magnet 124B travels through the central part of rotor core 123 and is attracted into permanent magnet 124C or permanent magnet 124D, respectively.

While, the flow of the magnetic flux in bore 131 in rotor core 123 is described in FIG. 3. The magnetic flux coming from permanent magnet 124A or permanent magnet 124B cannot travel through main bearing 111 made of aluminum-base material of non-magnetic material, so that the flux does not travel into hollow bore 131 and diffracts to proximity of a void formed of the outer periphery of main bearing 111 and the inner periphery of bore 131. Therefore, the magnetic path in this part is usually apt to become narrow and insufficient.

In exemplary embodiment 1, the axial length of rotor core 123 is longer than that of stator core 126 of stator 121, so that a wide magnetic path can be formed in the axial direction of rotor core 123. As a result, the magnetic flux amount (conventionally, insufficient) in rotor core 123 increases, and the loss decreases. As discussed above, motor element 103 of exemplary embodiment 1 has a wide magnetic path, and the flow of the magnetic flux by permanent magnet 124 is smooth.

Since the axial length of rotor core 123 that does not directly affect the height of hermetic container 101 is made long, the height of hermetic container 101 is not increased. The height of hermetic container 101 decreases by the depth (or axial length) of bore 131 comparing with the case having no bore 131, and hence hermetic container 101 can be downsized and lightened.

Since both axial ends of rotor core 123 are disposed outside both axial ends of stator core 126, respectively, so that the magnetic centers of stator 121 and rotor 125 substantially match with each other. Therefore, axial electromagnetic force hardly occurs, the electromagnetic force acting on rotor 125 can be effectively converted to the torque for rotating shaft 110, and hence the efficiency is further increased.

As a result, the hermetic compressor can be downsized and lightened, the cost can be reduced, and the efficiency can be increased.

When a hollow part is disposed in the shaft for oil supply, the magnetic path is apt to be insufficient similarly to the case having bore 131. Therefore, the actions by the above-mentioned configuration work further effectively, and a similar effect can be obtained.

Exemplary Embodiment 2

Figure 4:
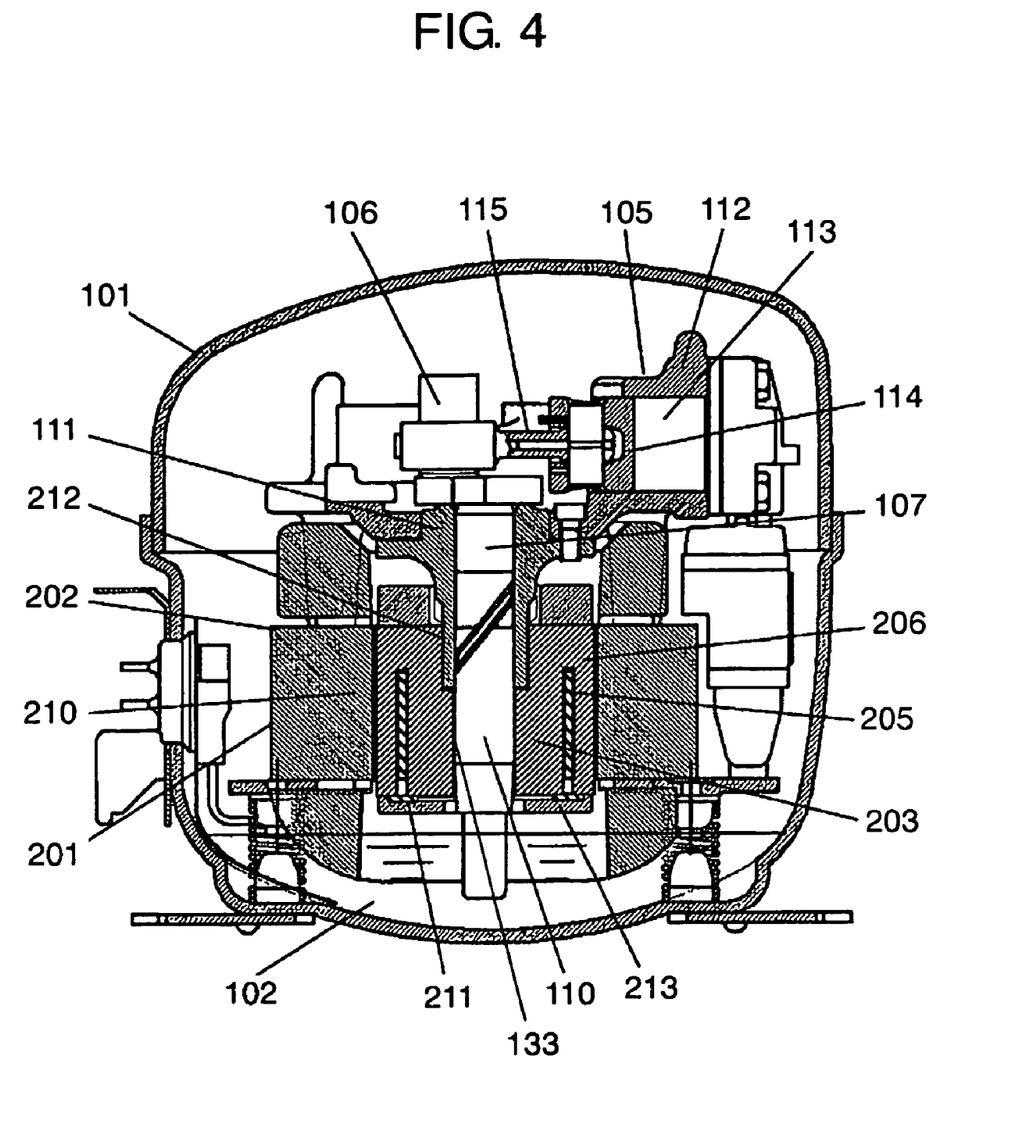
FIG. 4 is a longitudinal sectional view of a hermetic compressor in accordance with exemplary embodiment 2 of the present invention.

FIG. 4 is a longitudinal sectional view of a hermetic compressor in accordance with exemplary embodiment 2 of the present invention. In exemplary embodiment 2, elements similar to those in exemplary embodiment 1 are denoted with the same reference marks, and the detail descriptions of those elements are omitted.

In FIG. 4, hermetic container 101 reserves lubricating oil 102 on its bottom, and accommodates motor element 201 and compressing element 105 driven by motor element 201. Compressing element 105 has shaft 110 including eccentric shaft 106 and main shaft 107 and main bearing 111 for pivoting main shaft 107. Cylinder block 112 has a substantially cylindrical compressing chamber 113, and main bearing 111 made of aluminum-base material, namely non-magnetic material. Piston 114 is inserted into compressing chamber 113 of cylinder block 112 which can slide back and forth in compressing chamber 113, and is coupled to eccentric shaft 106 through connector 115.

In exemplary embodiment 2, motor element 201 is a bipolar self-starting permanent magnet synchronous motor that is formed of stator 202 and rotor 206. Rotor 206 has built-in permanent magnet 205 in rotor core 203. The thickness, namely axial length, of rotor core 203 is longer than that of stator core 210 of stator 202 in exemplary embodiment 2. End plate 211 for protection for preventing permanent magnet 205 from dropping is fixed to rotor core 203.

Hollow bore 212 is disposed at the end on the compressing element 105 side of rotor core 203, and main bearing 111 extends into bore 212. The axial length of permanent magnet 205 is shorter than that of rotor core 203. Permanent magnet 205 is fixed to the lower side of rotor core 203 having no bore 212. In other words, permanent magnet 205 covers the region having no bore 212 in the axial direction of rotor 206 (height direction in FIG. 4). Rotor core 203 has cylindrical through hole 133, and shaft 110 is inserted into through hole 133 with the first diameter. Bore 212 is an annular recessed part disposed in the upper part of through hole 133. In other words, bore 212 is a step having the second diameter larger than the first diameter of through hole 133. Therefore, the lower end of main bearing 111 is accommodated in bore 212, and hence inserted into the gap between shaft 110 and rotor core 203. Permanent magnet 205 covers a region of rotor core 203 having the second diameter.

Permanent magnet 205 is a magnet plate made of Neodymium Iron Boron ferromagnetic material, namely a rare-earth magnet. The configuration of permanent magnet 205 is similar to those of FIG. 2 and FIG. 3. In other words, two permanent magnets 205 form one rotor magnetic pole, and four permanent magnets 205 form two rotor magnetic poles in whole rotor 206. Many conductor bars that are disposed in rotor core 203 and short-circuit rings 213 that are positioned at both axial ends of rotor core 203 are unitarily molded by aluminum die casting, thereby forming a cage conductor for start. For preventing short circuit of magnetic fluxes of adjacent permanent magnets 205, barrier 132 for preventing short circuit of magnets is formed, and aluminum die casting is filled into the hole in barrier 132.

A refrigerant used in the compressor is a hydrocarbon refrigerant or the like, namely a natural refrigerant having low global warming potential such as R134a or R600a having zero ozone depleting coefficient, and is used in combination with lubricating oil having compatibility.

The operations of the hermetic compressor having this configuration are described hereinafter.

Rotor 206 of motor element 103 rotates shaft 110, and a rotation of eccentric shaft 106 is transmitted to piston 114 via connector 115, thereby reciprocating piston 114 in compressing chamber 113. Thus, refrigerant gas is sucked from a cooling system (not shown) into compressing chamber 113, compressed, and then discharged to the cooling system again.

Next, flow of the magnetic flux of permanent magnet 205 is conceptually described. The flow of the magnetic flux in the part having no bore 212 in rotor 206 is similar to that in FIG. 2. The magnetic flux coming from permanent magnet 205 travels through the central part of rotor core 203. While, the flow of the magnetic flux in the part which has bore 212 in rotor 206 is similar to that in FIG. 3. The magnetic flux coming from permanent magnet 205 cannot travel through hollow bore 212, because main bearing 111 made of non-magnetic material exists in bore 212. Therefore, the magnetic flux diffracts to proximity of the void formed of the outer periphery of main bearing 111 and the inner periphery of bore 212. The magnetic path in this part is therefore apt to become narrow and insufficient.

However, since the axial length of permanent magnet 205 is shorter than that of rotor core 203, the magnetic flux generated by permanent magnet 205 hardly leaks from the axial end of rotor core 203 to the outside. Therefore, the material cost of permanent magnet 205 can be reduced without largely reducing the effective magnetic flux amount. As discussed above, motor element 103 of exemplary embodiment 2 has a wide magnetic path, and the flow of the magnetic flux by permanent magnet 205 is smooth.

Permanent magnet 205 is disposed in the vertical direction of rotor 206 and at a lower position opposite to the upper position having bore 212. The vertical overlap between permanent magnet 205 and bore 212 is minimized. In this configuration, the magnetic flux by permanent magnet 205 occurs in the large part having no bore 212 in rotor core 203, so that a magnetic path wider than the size of permanent magnet 205 can be formed, the material cost of permanent magnet 205 can be reduced without largely reducing the effective magnetic flux amount of permanent magnet 205. Therefore, the efficiency is increased and simultaneously the cost is reduced.

Permanent magnet 205 is a rare-earth magnet. The rare-earth magnet can apply a strong magnetic force, so that the motor can be downsized and lightened, and the hermetic compressor can be downsized and lightened.

Therefore, the size and the weight can be further reduced, the cost can be reduced, and the efficiency can be increased.

When a hollow part such as a passage for oil supply is disposed in main shaft 107 of shaft 110, the magnetic path is apt to be insufficient similarly to the case having bore 212. Therefore, the operations by the above-mentioned configuration work further effectively, and a similar effect can be obtained.

Exemplary Embodiment 3

Figure 5:
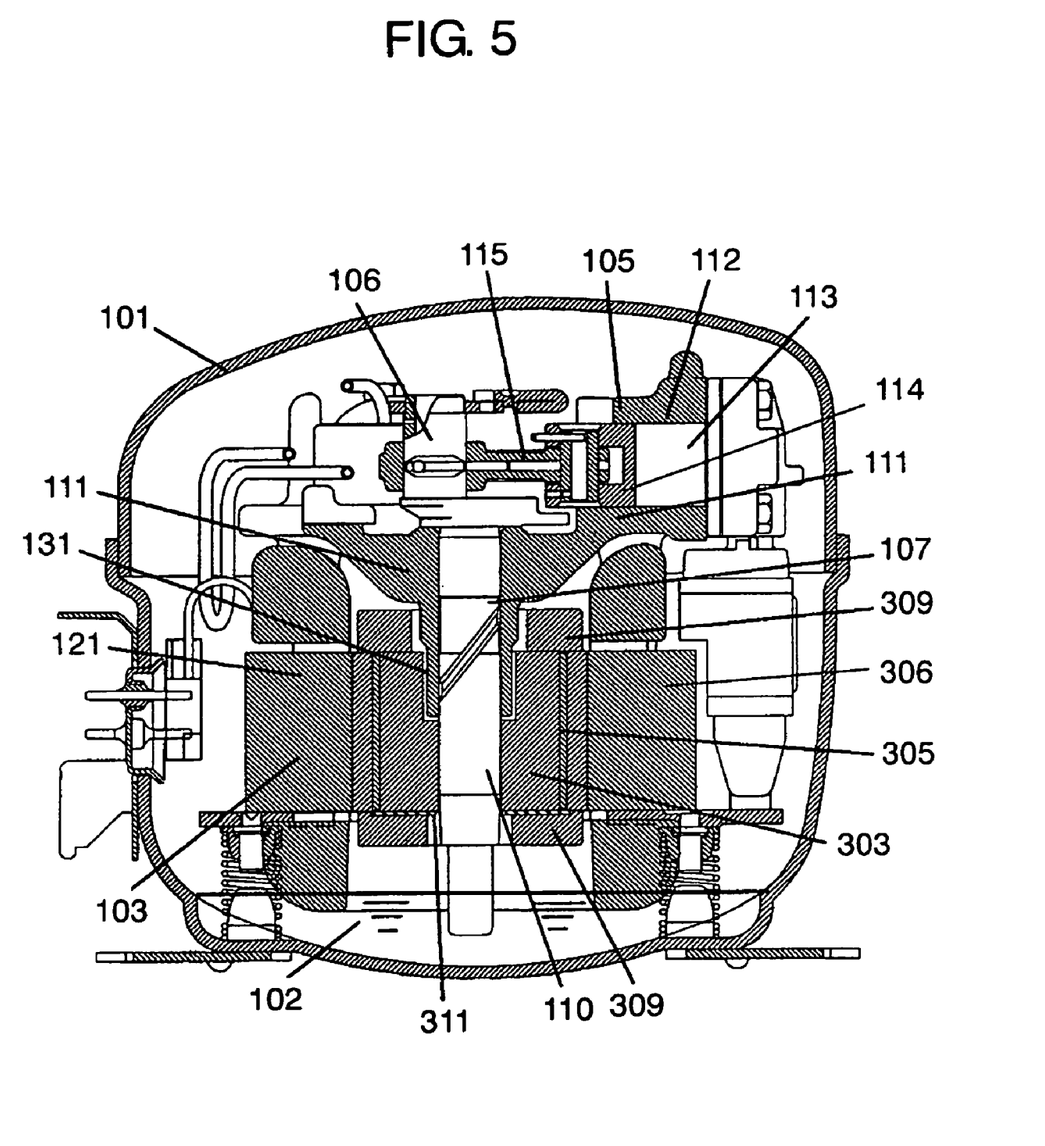
FIG. 5 is a longitudinal sectional view of a hermetic compressor in accordance with exemplary embodiment 3 of the present invention.
Figure 6:
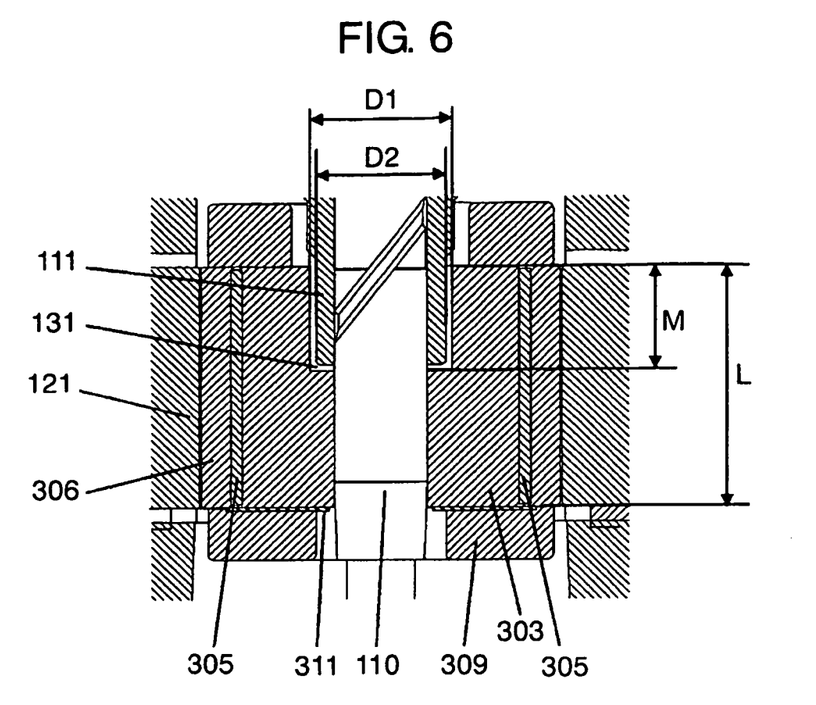
FIG. 6 is an enlarged sectional view of an essential part of the hermetic compressor in accordance with exemplary embodiment 3.
Figure 7:
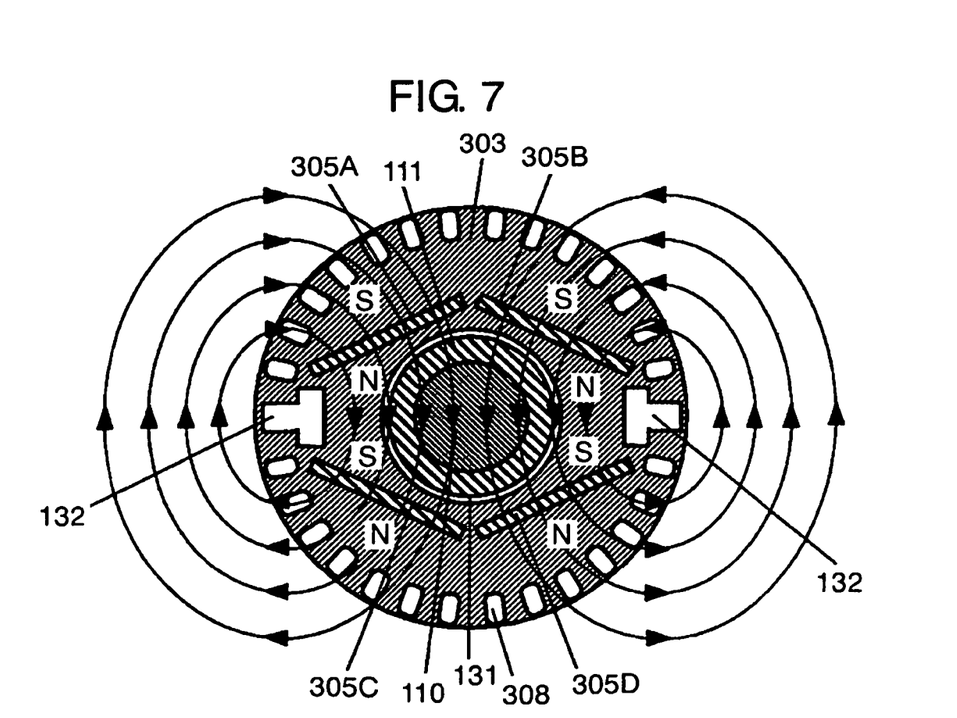
FIG. 7 is an axial sectional view of a part having a bore in a rotor in accordance with exemplary embodiment 3.
Figure 8:
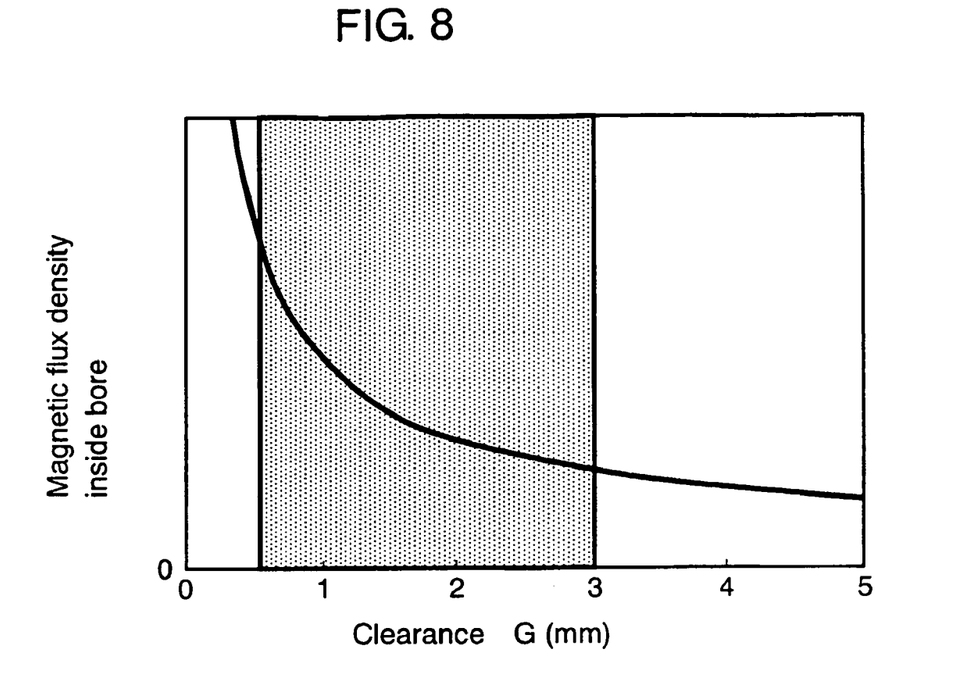
FIG. 8 is a characteristic diagram of magnetic flux density inside the bore in the rotor in accordance with exemplary embodiment 3.
Figure 9:
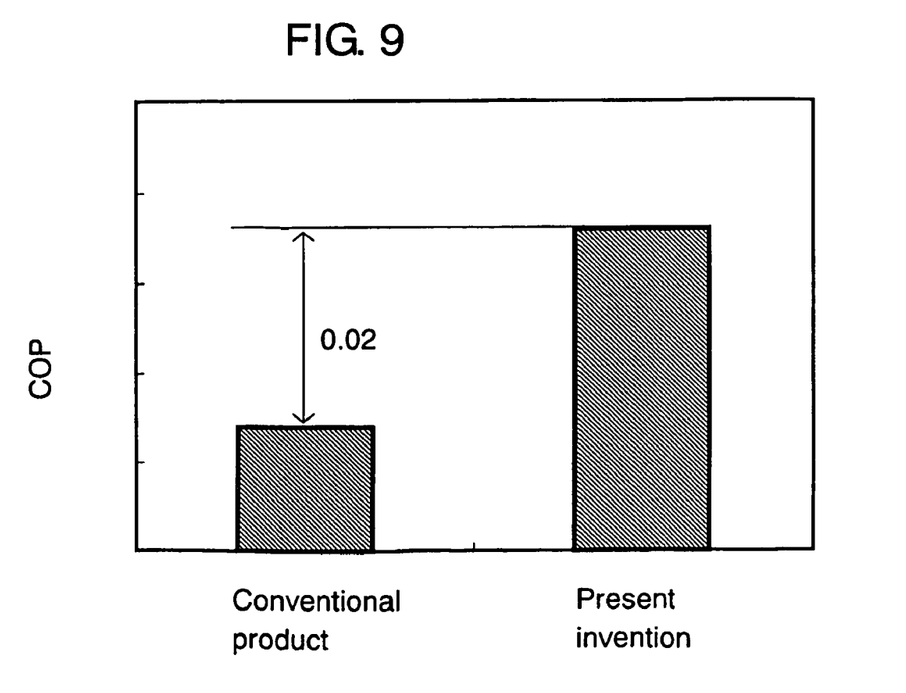
FIG. 9 is a characteristic diagram of coefficient of performance of the hermetic compressor in accordance with exemplary embodiment 3.

FIG. 5 is a longitudinal sectional view of a hermetic compressor in accordance with exemplary embodiment 3 of the present invention. FIG. 6 is an enlarged sectional view of an essential part of the hermetic compressor in accordance with exemplary embodiment 3. FIG. 7 is an axial sectional view of a part having a bore in a rotor in accordance with exemplary embodiment 3. FIG. 8 is a characteristic diagram between magnetic flux density inside the bore and the clearance between the diameter of the bore and the outer diameter of the main bearing, in the rotor in accordance with exemplary embodiment 3. FIG. 9 is a comparative characteristic diagram of coefficient of performance C.O.P of the hermetic compressor. In exemplary embodiment 3, elements similar to those in exemplary embodiment 1 are denoted with the same reference marks, and the descriptions of those elements are simplified.

As shown in FIG. 5, FIG. 6 and FIG. 7, hermetic container 101 reserves lubricating oil 102 inside, and accommodates motor element 103 and compressing element 105. Compressing element 105 has shaft 110 including eccentric shaft 106 and main shaft 107 and main bearing 111 for pivoting main shaft 107. Cylinder block 112 has a substantially cylindrical compressing chamber 113, and main bearing 111 made of casting of iron-based material, namely magnetic material. Piston 114 is inserted into compressing chamber 113 of cylinder block 112 slidably back and forth, and is coupled to eccentric shaft 106 through connector 115.

Motor element 103 is a bipolar self-starting permanent magnet synchronous motor that is formed of stator 121 and rotor 306. Rotor 306 has built-in permanent magnet 305 in rotor core 303. Thin end plate 311 for protection for preventing permanent magnet 305 from dropping is fixed to rotor core 303. Many conductor bars 308 that are disposed in rotor core 303 and short-circuit rings 309 that are positioned at both axial ends (in other words, upper and lower ends) of rotor core 303 are unitarily molded by aluminum die casting, thereby forming a cage conductor for start.

Hollow bore 131 is disposed at the end on the compressing element 105 side of rotor core 303, and main bearing 111 extends into bore 131.

As shown in FIG. 6, the thickness of rotor core 303 is denoted with L, the inner diameter and depth of bore 131 are denoted with D1 and M, respectively, and the outer diameter of main bearing 111 is denoted with D2. In exemplary embodiment 3, depth M is set ⅓ of thickness L or more, and clearance G between the outer periphery of main bearing 111 and the inner periphery of bore 131 is set at 0.5 to 3 mm. Here, $G=(D1-D2)/2$.

Permanent magnet 305 is a magnet plate made of Neodymium Iron Boron ferromagnetic material, namely a rare-earth magnet. Permanent magnet 305 is formed of permanent magnets 305A, 305B, 305C and 305D, and they are arranged as shown in FIG. 7. A pair of permanent magnets 305A and 305B of the same polarity are faced to each other around shaft 110 at a predetermined angle and a predetermined interval. While, a pair of other permanent magnets 305C and 305D of the same polarity are faced to each other around shaft 110 at a predetermined angle and a predetermined interval. All of permanent magnets 305A, 305B, 305C and 305D are buried in parallel with rotor core 303. The pair of permanent magnets 305A and 305B of the same polarity form one rotor magnetic pole, and the pair of other permanent magnets 305C and 305D of the same polarity form one rotor magnetic pole. Therefore, whole rotor 306 forms two rotor magnetic poles. For preventing short circuit of magnetic fluxes of adjacent permanent magnets 305A and 305C or of adjacent permanent magnets 305B and 305D, barrier 132 for preventing short circuit of magnets is formed. Barrier 132 is a hole hilled with aluminum die casting.

A refrigerant used in the compressor is a hydrocarbon-based refrigerant or the like, namely a natural refrigerant having low global warming potential such as R134a or R600a having zero ozone depleting coefficient, and is used in combination with lubricating oil having compatibility.

Operations and actions of the hermetic compressor having the above-mentioned configuration are described hereinafter.

Rotor 306 of motor element 103 rotates shaft 110. A rotation of eccentric shaft 106 is transmitted to piston 114 via connector 115, thereby reciprocating piston 114 in compressing chamber 113. Thus, refrigerant gas is sucked from a cooling system (not shown) into compressing chamber 113, is compressed, and is discharged to the cooling system again.

Flow of the magnetic flux of permanent magnet 305 is conceptually described with arrow lines in FIG. 7. FIG. 7 shows the flow of the magnetic flux in bore 131 in rotor core 303. As shown in FIG. 7, the magnetic flux coming from permanent magnet 305A or permanent magnet 305B travels through the clearance between the outer periphery of main bearing 111 and the inner periphery of bore 131, main bearing 111, and shaft 110, and is attracted into permanent magnet 305C or permanent magnet 305D, respectively.

At this time, main bearing 111 extending into bore 131 does not rotate, so that the travel of the magnetic flux causes eddy current loss. However, lost torque due to eddy current caused on the outer diameter of main bearing 111 is relatively smaller than the torque of the motor in itself generated on the outer periphery of rotor 303. That is because the distance from the rotating shaft is short and hence the force working as the braking torque is weak. While, main bearing 111 made of magnetic material and shaft 110 form a magnetic path, so that the magnetic flux amount generated in rotor 306 increases. This effect increases with increase in depth M of bore 131. As a result, the influence of the torque loss is small relatively. Therefore, the increase in magnetic flux amount generated in rotor 306 reduces the loss to increase the efficiency of motor element 103, and hence the efficiency of the hermetic compressor can be increased. As discussed above, motor element 103 of exemplary embodiment 3 has a wide magnetic path, and the flow of the magnetic flux by permanent magnet 305 is smooth.

Since depth M of bore 131 is set ⅓ of thickness L or more in exemplary embodiment 3 and is extremely deep, especially the magnetic flux amount generated in rotor 306 increases, the increasing effect of the efficiency is remarkable, and the whole height of the compressor is kept extremely low.

Main bearing 111 can be made of inexpensive casting or sintered material, and can be formed unitarily with cylinder block 112, so that the cost can be reduced.

As shown in FIG. 8, when clearance G (where, $G=(D1-D2)/2$) between bore 131 and main bearing 111 is increased, the magnetic flux density inside bore 131 decreases. However, when clearance G is increased larger than 3 mm, the magnetic flux density hardly decreases. When main bearing 111 and shaft 110 are used as a magnetic path through which the magnetic flux passes, the clearance up to 3 mm is considered to be appropriate. While, in consideration of the processing accuracies of the outer periphery of main bearing 111 and the inner periphery of bore 131, clearance G of 0.5 to 3 mm is most preferable and effective. By applying the above conditions, therefore, the magnetic resistance decreases, a strong magnetic path is formed, the leaking magnetic flux decreases, the magnetic flux amount increases, and the efficiency increases further.

In starting, a large current flows to generate torque in conductor bars 308. The magnetic force by built-in permanent magnet 305 works as braking torque in starting, so that a large starting torque is required. In exemplary embodiment 3, conductor bars 308 can be elongated and the starting torque can be increased, so that the starting property is good and high efficiency can be obtained.

More preferably, permanent magnet 305 is formed of a rare-earth magnet. The rear-earth magnet can apply a strong magnetic force, so that the motor can be downsized and lightened, and the hermetic compressor can be downsized and lightened.

Therefore, the size and the weight can be further reduced, the cost can be reduced, and the efficiency can be increased.

In exemplary embodiment 3, main bearing 111 made of casting of iron-base material is formed unitarily in cylinder block 112. A configuration where main bearing 111 made of iron-base sintered material is fixed also produces a similar advantage.

Increase in efficiency of the hermetic compressor in exemplary embodiment 3 is described hereinafter.

In FIG. 9, the vertical axis shows characteristics of coefficients of performance C.O.P (W/W) of the hermetic compressors of the conventional art and exemplary embodiment 3. Here, R600a is used as the refrigerant, and the operation frequency in reciprocating the piston is 50 Hz. The operation temperature condition is close to the operation condition in a refrigerator, the evaporation temperature is −25° C., and condensation temperature is 55° C.

As is clear from the result in FIG. 9, in the hermetic compressor of exemplary embodiment 3, the C.O.P is largely improved comparing with the conventional hermetic compressor, and the efficiency is increased.

INDUSTRIAL APPLICABILITY

In the hermetic compressor of the present invention, the magnetic flux amount in the rotor core increases to decrease the loss, the size and weight can be reduced, and the efficiency can be increased. Therefore, the hermetic compressor can be applied to an air conditioner or a refrigerator freezer.

The invention claimed is:

1. A hermetic compressor comprising:
a hermetic container;
a motor element accommodated in the hermetic container; and
a compressing element that is accommodated in the hermetic container and driven by the motor element,
wherein
the compressing element has a shaft including an eccentric shaft and a main shaft, and a main bearing for pivoting the main shaft,
the motor element is a bipolar permanent magnet motor that has a stator including a stator core and a rotor including a rotor core,
the rotor core defines a hollow bore and a through hole, the hollow bore extending from a first axial end of the rotor core, the first axial end on the compressing element side of the rotor core, the through hole extending from the first axial end of the rotor core to a second axial end of the rotor core, the hollow bore having a diameter larger than a diameter of the through hole,
the rotor core includes a built-in permanent magnet, an axial length of the permanent magnet being less than an axial length of the rotor core, the permanent magnet being positioned in the rotor core so that it extends from the second axial end of the rotor core opposite the hollow bore,
an axial length of the hollow bore is at least ⅓ of the axial length of the rotor core,
the main bearing is made of magnetic material,
the main bearing extends substantially to a bottom of the hollow bore such that the rotor core is rotatable with respect to the main bearing, and
a clearance between an inner surface of the hollow bore and an outer peripheral surface of the main bearing is 0.5 to 3 mm.

2. The hermetic compressor according to claim 1, wherein the axial length of the rotor core is longer than an axial length of the stator core.

3. The hermetic compressor according to claim 2, wherein both axial ends of the rotor core are disposed outside both axial ends of the stator core, respectively.

4. The hermetic compressor according to claim 2, wherein the permanent magnet covers a region having no hollow bore in the axial direction of the rotor.

5. The hermetic compressor according to claim 2, wherein, the shaft is inserted in the through hole,
the hollow bore is a cylindrical recessed part that is formed in an upper part of the through hole, and
the permanent magnet covers a region of the through hole in an axial direction of the rotor core.

6. The hermetic compressor according to claim 2, wherein the motor element is a self-starting permanent magnet synchronous motor,
the motor element has a plurality of conductor bars of a cage conductor on an outer periphery of the rotor core, and
the permanent magnet is disposed in an inner peripheral side of the conductor bars.

7. The hermetic compressor according to claim 2, wherein the permanent magnet is a rare-earth magnet.

8. The hermetic compressor according to claim 1, wherein the main bearing is one of a casting and a molded product that is made of iron-based sintered material.

9. The hermetic compressor according to claim 1, wherein the motor element is a self-starting permanent magnet synchronous motor,
the motor element has a plurality of conductor bars of a cage conductor on an outer periphery of the rotor core, and
the permanent magnet is disposed in an inner peripheral side of the conductor bars.

10. The hermetic compressor according to claim 1, wherein the permanent magnet is a rare-earth magnet.

* * * * *

UNITED STATES PATENT AND TRADEMARK OFFICE
CERTIFICATE OF CORRECTION

| | | |
|---|---|---|
| PATENT NO. | : 7,866,957 B2 | Page 1 of 1 |
| APPLICATION NO. | : 10/574383 | |
| DATED | : January 11, 2011 | |
| INVENTOR(S) | : Hironari Akashi et al. | |

It is certified that error appears in the above-identified patent and that said Letters Patent is hereby corrected as shown below:

Cover Page
Item (57), ABSTRACT, line 2, "in rotor core" should read -- in a rotor core --.

Signed and Sealed this
Thirty-first Day of May, 2011

David J. Kappos
*Director of the United States Patent and Trademark Office*